United States Patent
Huang et al.

(10) Patent No.: US 10,051,664 B2
(45) Date of Patent: Aug. 14, 2018

(54) APPARATUS, SYSTEM AND METHOD OF COMMUNICATING DURING A DISCOVERY WINDOW

(71) Applicant: INTEL IP CORPORATION, Santa Clara, CA (US)

(72) Inventors: Po-Kai Huang, Santa Clara, CA (US); Minyoung Park, Portland, OR (US); Emily H. Qi, Camas, WA (US)

(73) Assignee: INTEL IP CORPORATION, Santa Clara, CA (US)

( * ) Notice: Subject to any disclaimer, the term of this patent is extended or adjusted under 35 U.S.C. 154(b) by 270 days.

(21) Appl. No.: 14/670,530

(22) Filed: Mar. 27, 2015

(65) Prior Publication Data
US 2016/0198494 A1    Jul. 7, 2016

Related U.S. Application Data

(60) Provisional application No. 62/099,165, filed on Jan. 1, 2015.

(51) Int. Cl.
*H04W 74/08* (2009.01)
*H04W 74/00* (2009.01)

(52) U.S. Cl.
CPC ...... *H04W 74/0833* (2013.01); *H04W 74/006* (2013.01)

(58) Field of Classification Search
CPC .......................... H04W 74/08; H04W 74/0833; H04W 74/006
See application file for complete search history.

(56) References Cited

U.S. PATENT DOCUMENTS

| | | | | |
|---|---|---|---|---|
| 2011/0058572 A1* | 3/2011 | Du | ................... | H04W 74/006 370/458 |
| 2014/0003414 A1* | 1/2014 | Choudhury | ......... | H04W 74/006 370/347 |
| 2014/0198725 A1* | 7/2014 | Abraham | ................ | H04L 67/16 370/328 |
| 2014/0293992 A1* | 10/2014 | Abraham | .......... | H04W 52/0225 370/350 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Anez Ebrahim
(74) *Attorney, Agent, or Firm* — Shichrur & Co.

(57) ABSTRACT

Some demonstrative embodiments include apparatuses, systems and/or methods of communicating during a discovery window. For example, an apparatus may include logic and circuitry configured to cause a wireless station to select an access window from a plurality of access windows within a discovery window, the discovery window being configured to communicate awareness networking messages according to a contention mechanism; and contend to transmit a service discovery frame during the selected access window.

24 Claims, 5 Drawing Sheets

(56) References Cited

OTHER PUBLICATIONS

Wi-Fi Alliance, Wi-Fi Peer-to-Peer (P2P) Technical Specification Version 1.5, Aug. 4, 2014, 183 pages.
IEEE P802.11ah™/D3.1; Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Sub 1 GHz License Exempt Operation, Nov. 2014, 611 pages.

* cited by examiner

APPARATUS, SYSTEM AND METHOD OF COMMUNICATING DURING A DISCOVERY WINDOW

CROSS REFERENCE

This application claims the benefit of and priority from U.S. Provisional Patent Application No. 62/099,165 entitled "Apparatus, System and Method of Communicating During a Discovery Window", filed Jan. 1, 2015, the entire disclosure of which is incorporated herein by reference.

TECHNICAL FIELD

Embodiments described herein generally relate to communicating during a discovery window.

BACKGROUND

In some wireless communication networks, communication may be performed during discovery windows (DWs).

Stations may be allowed to transmit a discovery frame during a DW, in order to enable the stations to discover other devices or services that are running on the other devices.

Transmissions may be preformed during the DW based on a contention mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
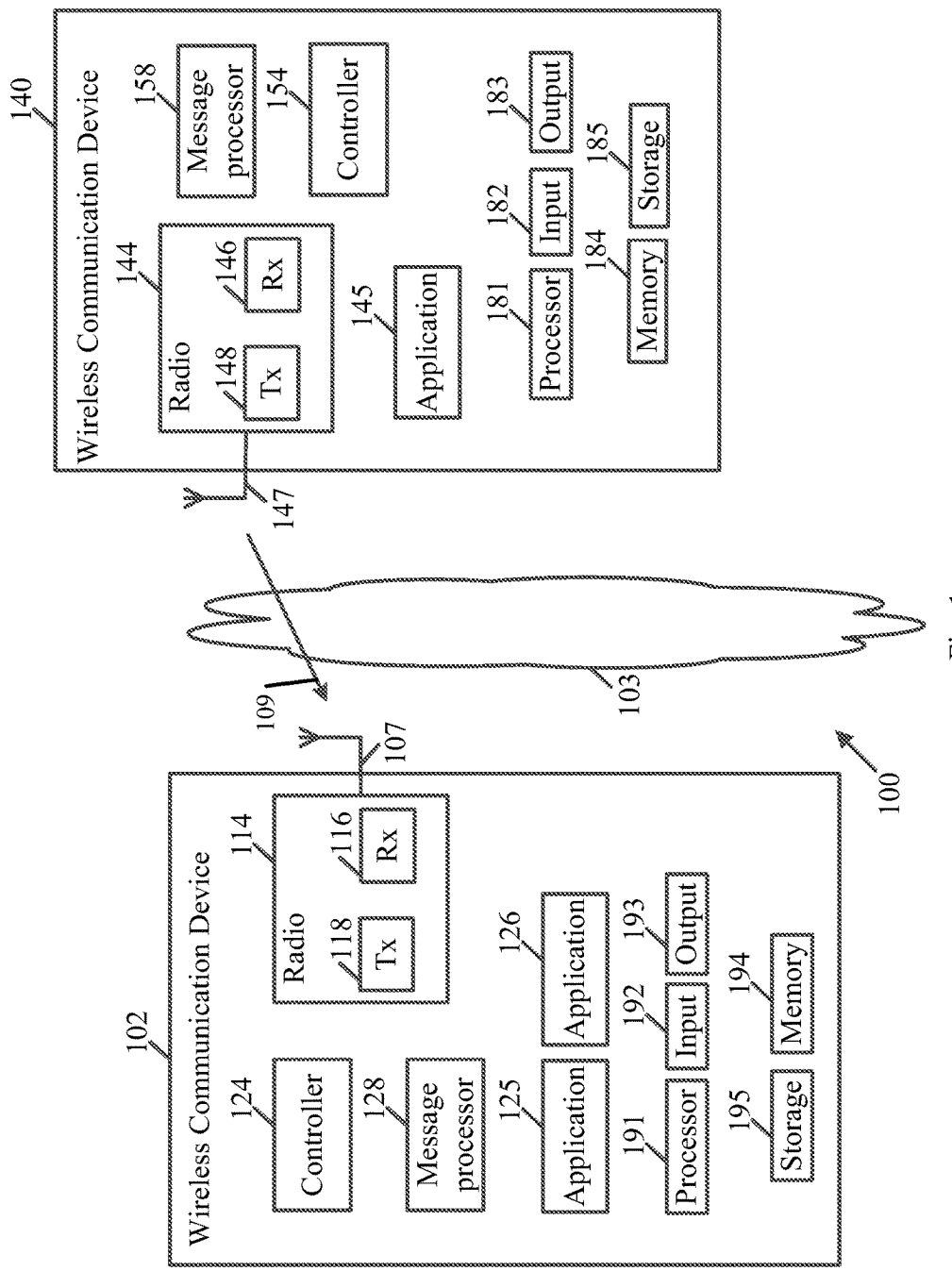
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (*WiFi P2P technical specification*, version 1.2, 2012) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification* Version 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad (*"IEEE P802.11ad-2012, IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012); IEEE-802.11REVmc (*"IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"*); and/or IEEE 802.11ah (*IEEE P802.11ah™/D1.2; Draft Standard for Information technology—Telecommunications and information exchange between systems Local and metropolitan area networks—Specific requirements; Part 11: Wireless LAN Medium Access Control (MAC) and Physical Layer(PHY) Specifications; Amendment 6: Sub 1 GHz License Exempt Operation*", February 2014)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a User Equipment (UE), a Mobile Device (MD), a Station (STA), a Sub 1 Gigahertz (S1G) STA, a sensor type STA, an Access Point (AP), an AP STA, a non-AP STA, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In one example, a Sub 1 GHz (S1G) station (STA) may include a station configured to communicate over one or more frequency bands below 1 GHz. In one example, a S1G STA may be configured, for example, to communicate over one or more bands below 1 GHz, for example, excluding the TV White Space bands, e.g., with a transmission range up to 1 Kilometer (km) and a minimum data rate of at least 100 Kilobyte per second (Kb/s), or any other range and/or data rate. The S1G STA may perform any other additional or alternative functionality.

In one example, a sensor type station (STA) may include, for example, a STA characterized as small data size, low traffic, limited available power, and large number of STAs per AP. The sensor type STA may perform any other additional or alternative functionality.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 GHz frequency band, a 5 GHz frequency band, a millimeterWave (mmWave) frequency band, e.g., a 60 GHz frequency band, and/or any other frequency band.

Additionally or alternatively, wireless communication medium 103 may include a wireless communication channel over a sub 1 Gigahertz (GHz) (S1G) frequency band.

In some demonstrative embodiments, devices 102 and/or 140 may be configured to communicate over the S1G band. For example, devices 102 and/or 140 may be configured to perform the functionality of a S1G STA, e.g., as described below.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may be configured to communicate over the S1G band, a 2.4 GHz band, a 5 GHz band, a mmWave band, and/or any other band.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may form and/or communicate as part of a wireless local area network (WLAN).

In some demonstrative embodiments, devices 102 and/or 140 may be part of, or may form, and/or communicate as part of a WiFi network.

In some demonstrative embodiments, devices 102 and/or 140 may be part of, or may form, and/or communicate as part of a WiGig network.

In some demonstrative embodiments, wireless communication devices 102 and/or 140 may form and/or communicate as part of a WiFi Direct (WFD) network, e.g., a WiFi direct services (WFDS) network, and/or may perform the functionality of one or more WFD devices.

In one example, device 102 and/or device 140 may include, or may perform the functionality of a WiFi Direct device.

In some demonstrative embodiments, wireless communication devices 102 and/or 140 may be capable of performing awareness networking communications, e.g., as described below.

In some demonstrative embodiments, wireless communication devices 102 and/or 140 may be capable of performing awareness networking communications, for example, according to a WiFi Specification, for example, according to a WiFi Aware protocol, and/or any other Specification and/or protocol, e.g., as described below.

In some demonstrative embodiments, wireless communication devices 102 and/or 140 may be capable of performing awareness networking communications over the S1G band, e.g., as described below.

In some demonstrative embodiments, wireless communication devices 102 and/or 140 may be capable of forming and/or communicating as part of a Neighbor Awareness Networking (NAN) network, e.g., a WiFi NAN, and/or may perform the functionality of one or more NAN devices.

In some demonstrative embodiments, wireless communication medium 103 may include a direct link, for example, a PTP link, e.g., a WiFi direct P2P link, for example, to enable direct communication between device 102 and device 140.

In some demonstrative embodiments, wireless communication devices 102 and/or 140 may perform the functionality of WFD P2P devices. For example, devices 102 and/or 140 may be able to perform the functionality of a P2P client device, and/or P2P group Owner (GO) device.

In other embodiments, wireless communication devices 102 and/or 140 may form and/or communicate as part of any other network and/or perform the functionality of any other wireless devices or stations.

In some demonstrative embodiments, devices 102 and/or 140 may include one or more applications configured to provide, share, and/or to use one or more services, e.g., a social application, a file sharing application, a media application and/or the like, for example, using an awareness network, NAN network, a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102 and 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102 and/or 140 may include a controller configured to control one or more functionalities of devices 102 and/or 140, for example, one or more functionalities of communication, e.g., awareness networking communications, NAN communication, communication over the 2.4 and/or 5 GHz bands, communication over the S1G, and/or any other band, and/or any other communication between devices 102, 140 and/or other devices, and/or any other functionality, e.g., as described below. For example, device 102 may include a controller 124, and/or device 140 may include a controller 154.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of controllers 124 and/or 154 may be implemented by logic, which may be executed by a machine and/or one or more processors, e.g., as described below.

In one example, controller 124 may include one or more processors including circuitry and/or logic to cause a wireless device, e.g., device 102, and/or a wireless station, e.g., a wireless STA implemented by device 102, to perform one or more operations, communications and/or functionalities, e.g., as described herein.

In one example, controller 154 may include one or more processors including circuitry and/or logic to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and/or 140 may perform the functionality of a device and/or station, for example, a STA, a NAN STA, a S1G STA, a NAN device, a WFD device, a mmWave STA, a WLAN device, and/or any other device capable of discovering other devices according to a discovery protocol and/or scheme.

In some demonstrative embodiments, radios 114 and/or 144 may communicate over wireless communication medium 103 according to an awareness networking scheme, for example, a discovery scheme, e.g., a NAN discovery scheme, or any other awareness networking and/or discovery scheme, e.g., as described below.

In some demonstrative embodiments, devices 102 and/or 140 may be configured to perform awareness networking communications over the S1G band, e.g., as described below.

Additionally or alternatively, 102 and/or 140 may be configured to perform awareness networking communications over the 2.4 GHz band, the 5 GHz band, the 60 GHz band, and/or any other band.

In some demonstrative embodiments, devices 102 and/or 140 may be configured to perform the awareness networking communications, e.g., over the S1G band and/or any other band, according to an awareness networking scheme, e.g., as described below.

In some demonstrative embodiments, the awareness networking scheme may include a discovery scheme or protocol, e.g., as described below.

In some demonstrative embodiments, devices 102 and/or 140 may perform a discovery process according to the discovery scheme, for example, to advertize and/or to discover each other and/or one or more services, and/or to establish a wireless communication link, e.g., directional and/or high throughput wireless communication link.

In some demonstrative embodiments, devices 102 and/or 140 may communicate one or more discovery frames, for example, to advertize and/or to discover each other and/or one or more services.

In some demonstrative embodiments, devices 102 and/or 140 may be configured to enable time synchronization between device 102, device 140 and/or one or more other devices, e.g., performing the functionality of Wi-Fi stations (STAs), for example, such that STAs can discover and/or advertize each other and/or one or more services more efficiently and/or quickly and/or with reduced power consumption.

Some demonstrative embodiments are described below with respect to a NAN discovery scheme, and to NAN discovery frames of the NAN discovery scheme. However, in other embodiments, any other awareness networking and/or discovery scheme, and/or any other awareness networking and/or discovery frames may be used.

In some demonstrative embodiments, the discovery scheme may include a plurality of contention-based discovery windows (DWs).

In some demonstrative embodiments, devices 102 and/or 140 may communicate one or more discovery frames during one or more discovery windows.

In some demonstrative embodiments, communication during the DWs may be configured to enable time synchronization between Wi-Fi stations (STAs), e.g., devices 102 and/or 140, so that STAs can find each other more efficiently during a DW.

In some demonstrative embodiments, one of devices 102 and 140, e.g., device 102, may perform the functionality of a NAN master device, a master device, an anchor device, an anchor master device, or a manger device, which may be configured to transmit one or more beacons, e.g., as described below.

In some demonstrative embodiments, another one of devices 102 and 140, e.g., device 140, may perform the functionality of a NAN device, which may be configured to receive and process the beacons, e.g., as described below.

In some demonstrative embodiments, the NAN master device may be configured to transmit a Synchronization (Sync) beacon, e.g., within a DW, and/or a Discovery beacon, e.g., between consecutive DWs, e.g., as described below.

In some demonstrative embodiments, the Sync beacons and/or Discovery beacons may include information for performing one or more NAN operations, for example, timestamp information, which may be used for time synchronization among the NAN devices.

In some demonstrative embodiments, devices 102 and/or 140 may perform the functionality of NAN devices, e.g., belonging to a NAN cluster, which may share a common set of NAN parameters, for example, including a common NAN timestamp, and/or a common time period between consecutive discovery windows, e.g., as described above.

In some demonstrative embodiments, the NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102 and/or 140 may be configured to transmit and/or receive beacons, for example, sync beacons, discovery beacons and/or service discovery frames, within a NAN cluster including devices 102 and/or 140, for example, according to a discovery scheme, e.g., as described below with reference to FIG. 2.

Figure 2:
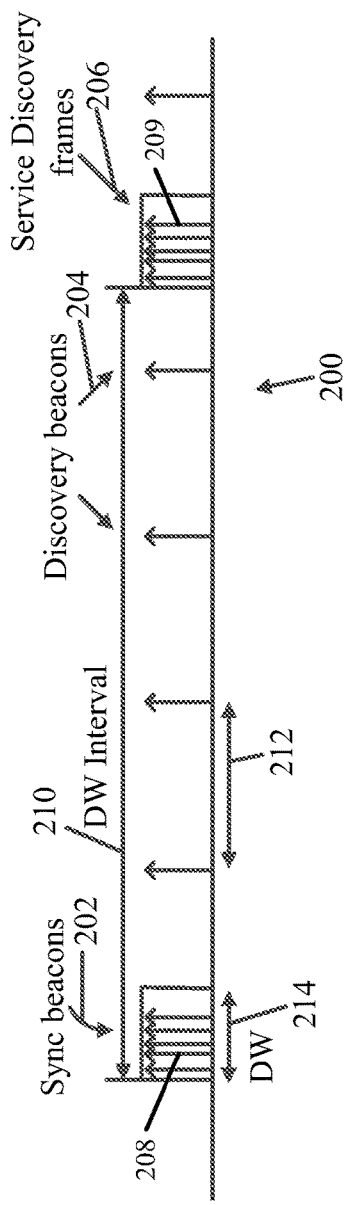
FIG. 2 is a schematic illustration of a discovery scheme, in accordance with some demonstrative embodiments.

Reference is made to FIG. 2, which schematically illustrates a discovery scheme 200, in accordance with some demonstrative embodiments. For example, devices 102 and/or 140 (FIG. 1) may communicate over WM 103 (FIG. 1) according to discovery scheme 200.

FIG. 2 is a schematic illustration of a discovery scheme 200, in accordance with some demonstrative embodiments. For example, devices 102 and/or 140 (FIG. 1) may communicate over WM 103 (FIG. 1) according to discovery scheme 200.

In one example, devices 102 and/or 140 (FIG. 1) may perform awareness networking communications according to discovery scheme 200.

As shown in FIG. 2, in some demonstrative embodiments discovery scheme 200 may include a plurality of DWs, e.g., including two consecutive DWs 208 and 209.

As shown in FIG. 2, one or more discovery frames 206 may be communicated during a DW. For example, devices 102 and/or 140 (FIG. 1) may communicate one or more service discovery frames (SDF) 206 during DWs 208 and 209.

As shown in FIG. 2, a DW of the plurality of the DW may have a duration ("the DW duration") 214.

As shown in FIG. 2, in some demonstrative embodiments two consecutive DWs of discovery scheme 200, e.g., the two consecutive DWs 208 and 209, may be separated by a time period ("the DW interval") 210.

As shown in FIG. 2, in some demonstrative embodiments one or more Synchronization (Sync) beacons 202 may be communicated within a DW, e.g., within DWs 208 and/or 209.

As shown in FIG. 2, in some demonstrative embodiments one or more Discovery beacons 204 may be communicated between consecutive DWs, e.g., during the DW interval 210.

As shown in FIG. 2, in some demonstrative embodiments communication of two consecutive discovery beacons 204 may be separated by a time period 212 ("discovery beacon interval").

In some demonstrative embodiments, a NAN technology, e.g., a WiFi NAN technology, may be configured to enable low power device/service discovery based on Wi-Fi, e.g., in the 2.4 and/or 5 GHz frequency bands ("the 2.4/5 GHZ bands").

In one example, DW interval 210 may be set to 512 Time Units (TUs), or any other duration; DW duration 214 may be set to 16 TUs, or any other duration; and/or Discovery beacon interval 212 may be set to have a duration of 100 TU, or any other duration. For example, a TU may include a time period of 1024 microseconds (usec) or any other time period.

Referring back to FIG. 1, in some demonstrative embodiments, devices 102 and/or 140 may be configured to perform awareness networking over the 2.4/5 GHz bands according to discovery scheme 200 (FIG. 2), e.g., as described below.

In some demonstrative embodiments, devices 102 and/or 140 may be configured to perform awareness networking over the S1G band according to discovery scheme 200 (FIG. 2).

In some demonstrative embodiments, devices 102 and/or 140 may be configured to perform awareness networking in a dense environment, e.g., an environments having a large number of devices, applications and/or services.

In one example, devices 102 and/or 140 may be configured to communicate according to Wi-Fi Aware protocol, e.g., a WiFi NAN protocol, which may be over the S1G band, for example, in accordance with an S1G Specification, e.g., an IEEE 802.11ah Specification.

In some demonstrative embodiments, communication over the S1G band may enable wireless communication for a long-range, e.g., a range of 1-2 kilometers.

In some demonstrative embodiments, awareness networking communication over the S1G band may enable, for example, long-range discovery.

In some demonstrative embodiments, the long-range discovery, e.g., on the S1G band or any other band, may result in a situation in which a large number of devices, e.g., hundreds of devices, may be in an area of the long-range discovery.

In another example, a popularity of IoT devices, applications, wireless devices, and/or services may create a dense environment, e.g., including hundreds of devices, for example, on the 2.4 GHz and/or 5 GHz bands or any other band.

In some demonstrative embodiments, performing a discovery process in the dense environment may result in a situation in which a large number of devices, e.g., hundreds of devices, may contend with each other for a scarce wireless medium.

In some demonstrative embodiments, performance in the dense environment may be degraded, for example, if a proper method of contention for the wireless medium is not utilized.

In some demonstrative embodiments, a discovery scheme, e.g., discovery scheme 200 (FIG. 2), may be configured to support communication in a dense environment, e.g., including hundreds of devices, services and/or applications.

Some demonstrative embodiments may enable to address issues of a congested environment, for example, through medium regulation, e.g., as described below.

In some demonstrative embodiments, at least part of a discovery window, e.g., discovery windows 208 and/or 209 (FIG. 2), for example, the entire duration of the discovery window, or part of the duration of the discovery window, may include, e.g., may be divided into, a plurality of access windows, e.g., as described below.

In some demonstrative embodiments, one or more STAs, e.g., devices 102 and/or 140, may be configured to choose an Access Window within the discovery window, e.g., in a distributed manner, to contend for the wireless medium to transmit a service discovery frame, e.g., as described below.

In some demonstrative embodiments, controller 124 may be configured to select an access window from a plurality of access windows within a discovery window.

In some demonstrative embodiments, the discovery window may be configured to communicate awareness networking messages according to a contention mechanism.

In some demonstrative embodiments, device 102 may be configured to contend to transmit a service discovery frame during the selected access window.

In some demonstrative embodiments, the service discovery frame may include a Neighbor Awareness Networking (NAN) Service Discovery Frame (SDF).

In some demonstrative embodiments, the service discovery frame may be in compliance with an IEEE 802.11ah Specification.

In some demonstrative embodiments, device 102 may be configured to contend to transmit the service discovery frame over a sub 1 Gigahertz (S1G) band.

In some demonstrative embodiments, the service discovery frame may be in compliance with a Wireless Fidelity (WiFi) Specification.

In some demonstrative embodiments, device 102 may be configured to contend to transmit the service discovery frame over a 2.4 Gigahertz (GHz) or 5 GHz band.

In some demonstrative embodiments, the plurality of access windows may occupy at least part of the discovery window.

In some demonstrative embodiments, an entire duration of the discovery window may include, e.g., may be divided into, the plurality of access windows.

In some demonstrative embodiments, only part of the discovery window may include, e.g., may be divided into, the plurality of access windows.

In some demonstrative embodiments, the discovery window may include a first period followed by a second period.

In some demonstrative embodiments, the first period may be configured, for example, for communication of one more one or more synchronization beacons.

In some demonstrative embodiments, the second period may include the plurality of access windows.

In some demonstrative embodiments, controller 124 may be configured to process one or more synchronization beacons communicated during the first period of the discovery window, and to select the access window within the second period of the discovery window, e.g., as described below with reference to FIG. 3.

In some demonstrative embodiments, a duration of the first period may be 2 milliseconds (ms) or less, e.g., 1 ms or less.

In other embodiments, the first period may have any other duration, e.g., shorter than or longer than 2 ms.

Figure 3:
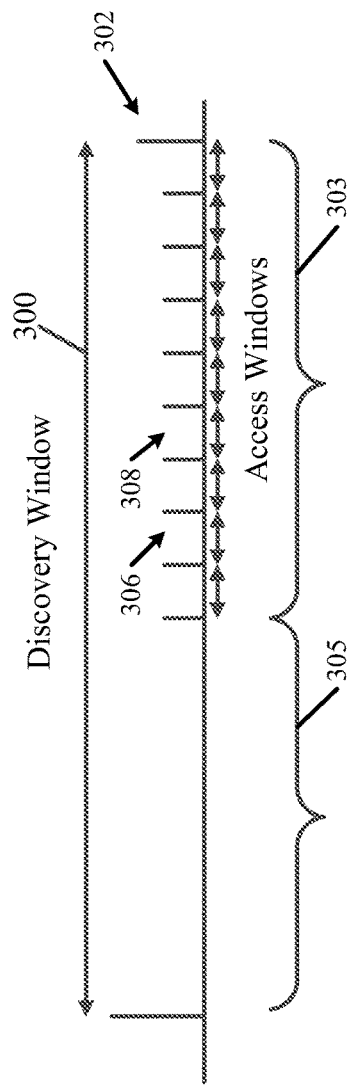
FIG. 3 is a schematic illustration of a discovery window including a plurality of access windows, in accordance with some demonstrative embodiments.

Reference is made to FIG. 3, which schematically illustrates a discovery window 300 including a plurality of access windows 302, in accordance with some demonstrative embodiments. For example, discovery windows 208 and/or 209 (FIG. 2) may be configured according to the configuration of discovery window 300.

In some demonstrative embodiments, at least a portion of discovery window 300 may include, e.g., may be divided into, the plurality of access windows 302.

In one example, as shown in FIG. 3, a portion 303 of discovery window 300 may include, e.g., may be divided into, the plurality of access widows, while a portion 305 may not be divided.

In some demonstrative embodiments, a STA, e.g., devices 102 and/or 140 (FIG. 1), may be configured to process one or more synchronization beacons communicated during portion 305.

In another example, the entire duration of discovery window 300 may include, e.g., may be divided into, access windows 302.

In some demonstrative embodiments, the plurality of access windows 302 may all be set to have the same duration. In other embodiments, two or more of access windows 302 may have two or more different durations.

In some demonstrative embodiments, the plurality of access windows 302 may be defined by a start time 312 of a first access window of the plurality of access windows 302, and/or an access window duration 314 of the plurality of access windows 302.

In one example, as shown in FIG. 3, portion 303 of discovery window 300 may include an access window 306 and an access window 308.

In some demonstrative embodiments, a STA, e.g., devices 102 and/or 140 (FIG. 1), may be configured to select a selected access window, e.g., access window 306, of access windows 302 within the discovery window 300, e.g., in a distributed manner, and may contend for the wireless medium to transmit a service discovery frame during the selected access window 306, e.g., as described above.

In some demonstrative embodiments, discovery window 300 may be applied to an awareness networking protocol, for example, a NAN protocol, e.g., a WiFi NAN protocol, which, for example, may not have an associated access point for each device.

Referring back to FIG. 1, in some demonstrative embodiments, controller 124 may select the access window, e.g., access window 306 (FIG. 3), within the discovery window, for example, based on one or methods and/or functions, e.g., as described below.

In some demonstrative embodiments, controller 124 may be configured to randomly select the access window.

In one example, controller 124 may choose one access window in a uniformly random manner.

In some demonstrative embodiments, controller 124 may select the access window based on one or more inputs, e.g., as describes below.

In some demonstrative embodiments, controller 124 may select the access window, for example, based on a mapping function.

In one example, the mapping function may be defined, e.g., as follows:

$$\text{The selected window} = f(x1, x2, x3, \ldots, xn) \bmod A \tag{1}$$

wherein x1, x2, ... xn denote n≥1 inputs for the mapping function, denoted $f$, and A denotes a number of the plurality of access windows within the discovery window.

In some demonstrative embodiments, controller 124 may select the access window, for example, based on an identifier of device 102.

In some demonstrative embodiments, the identifier of device 102 may include a Media Access Control (MAC) address of device 102.

In one example, controller 124 may select the access window based on a hash function to be performed on the MAC address of device 102.

For example, the hash function may map a plurality of MAC addresses to the plurality of access windows.

In some demonstrative embodiments, controller 124 may select the access window, for example, based on a service descriptor of a service to be identified by the service discovery frame.

In some demonstrative embodiments, controller 124 may content to transmit a service discovery frame during an access window, for example, if a service descriptor of a service identified by the service discovery frame is mapped to the access window.

In some demonstrative embodiments, a plurality of service descriptors of a plurality of services may be mapped to the plurality of access windows.

In some demonstrative embodiments, a first service descriptor of a first service may be mapped to a first access window, and/or a second service descriptor of a second, e.g., different, service may be mapped to a second access window.

In one example, service descriptors of pointing services may be mapped to access window 306 (FIG. 3), service descriptors of file sharing services may be mapped to access window 308 (FIG. 3), and/or any other service descriptors of any other service may be mapped to any other access windows of the plurality of accesses windows 302 (FIG. 3).

In other embodiments, controller 124 may select the access window according to any other selection mechanism and/or criterion.

In some demonstrative embodiments, transmission of the service discovery frame during the selected access window may fail, for example, if the selected access window is occupied and/or congested.

In some demonstrative embodiments, controller 124 may be configured to contend to transmit the service discovery frame during another selected access window within the discovery window, for example, if transmission of the service discovery frame during the selected access window fails.

In one example, a transmission of a service discovery frame during a first access window, e.g., access window 306 (FIG. 3), may fail. According to this example, controller 124 may contend to transmit the service discovery frame during a second access window, e.g., access window 308 (FIG. 3).

In some demonstrative embodiments, controller 124 may select the another selected access window within the discovery window, based on one or methods and/or functions, e.g., as described above.

In some demonstrative embodiments, device 102 may contend to transmit the service discovery frame during the access window, for example, based on a backoff mechanism.

In one example, device 102 may contend to transmit during the access window by maintaining a separate backoff mechanism, e.g., a backoff state machine, inside the access window.

In one example, device 102 may contend to transmit during the access window by maintaining a separate backoff window for each access window of the plurality of access windows.

In some demonstrative embodiments, device 102 may contend to transmit the service discovery frame during the another access window, e.g., if the transmission of the service discovery frame during the selected access window fails.

In one example, one or more backoff parameters may be the same for the selected access window and the another access window.

In another example, device 102 may reset the backoff parameters and/or may select different backoff parameters for the another access window.

In some demonstrative embodiments, the plurality of access windows may be defined by one or more parameters ("the access window parameters").

In some demonstrative embodiments, the access window parameters may include a start time ("a first access window start time") of a first access window of the plurality of access windows, e.g., start time 312 (FIG. 3), and/or a duration ("an access window duration") of an access window of the plurality of access windows, e.g., access window duration 314 (FIG. 3).

In some demonstrative embodiments, the access window parameters may be predefined, preset and/or preconfigured.

In one example, the access window parameters may be defined by an IEEE 802.11ah Specification.

In another example, the access window parameters may be defined by any other Specification and/or Protocol.

In some demonstrative embodiments, the access window parameters may be determined and/or announced by a device according any suitable mechanism and/or protocol.

In some demonstrative embodiments, the access window parameters may be announced by sync devices of a cluster, for example, as part of one or more messages, for example, beacons, e.g., sync beacons.

In some demonstrative embodiments, the access window parameters may be announced by a master of a cluster, for example, as part of one or more messages, for example, beacons, e.g., sync beacons.

In some demonstrative embodiments, the access window parameters may be determined in a centralized manner, for example, by an anchor master of each cluster.

In some demonstrative embodiments, the access window parameters may be determined in a distributed manner, for example, by sync devices and/or master devices.

In some demonstrative embodiments, devices 102 and/or 140 may be configured to determine the access window parameters.

In one example, devices 102 and/or 140 may determine the access window parameters, for example, based on one or more methods and/or calculations.

In some demonstrative embodiments, devices 102 and/or 140 may be configured to announce the access window parameters.

In some demonstrative embodiments, devices 102 and/or 140 may be configured to announce the access window parameters, for example, as part of one or more messages, for example, beacons, e.g., sync beacons.

In some demonstrative embodiments, a device of devices 102 and/or 140 may be configured to set the plurality of access windows, for example, according to an announcement from another device, e.g., as described below.

In some demonstrative embodiments, device 102 may be configured to set the plurality of access windows according to a beacon message 109 received from another device, e.g., device 140.

In some demonstrative embodiments, beacon message 109 may include a sync beacon.

In some demonstrative embodiments, beacon message 109 may include the access window parameters.

In some demonstrative embodiments, beacon message 109 may include a first access window start time, and an access window duration of the plurality of access windows.

In some demonstrative embodiments, message generator 158 may generate beacon message 109.

In some demonstrative embodiments, radio 144 may transmit beacon message 109 to devices of a NAN cluster, e.g., including device 102.

In some demonstrative embodiments, device 102 may receive beacon 109, and message processor 128 may process beacon message 109.

In some demonstrative embodiments, controller 124 may set the plurality of access windows, for example, based on beacon message 109 from device 140.

In some demonstrative embodiments, controller 124 may set a first access window start time of the plurality of access windows, for example, based on the first access window start time in beacon message 109, e.g., start time 312 (FIG. 3).

In some demonstrative embodiments, controller 124 may set an access window duration of the plurality of access windows, for example, based on the access window duration in beacon message 109, e.g., access window duration 314 (FIG. 3).

In some demonstrative embodiments, device 102 may select an access window of the plurality of access windows, e.g., as defined by the access window parameters in beacon message 109.

In one example, device 102 may select the access window, for example, based on the MAC address of device 102, e.g., as described above.

In some demonstrative embodiments, device 102 may contend to transmit a service discovery frame during the selected access window, e.g., as described above.

In some demonstrative embodiments, using a discovery window, which includes a plurality of access windows, e.g., as described above, may provide increased performance, e.g., in dense environments, for example, compared to a contention window, which does not include a plurality of access windows.

In one example, an approach of choosing a backoff window within the entire discovery window in order to address the contention of transmitting a discovery frame may be disadvantageous. For example, one disadvantage of this approach is that the size of the backoff window may directly limit the availability of addressing collision.

For example, when a size of the backoff window is W, and the number of devices is N, the expected number, denoted P, of devices that do not choose the same backoff window may be determined, e.g., as follows:

$$P = N \left( \frac{W-1}{W} \right)^{N-1} \quad (2)$$

In some demonstrative embodiments, Equation 2 may be derived with a similar approach of deriving the performance of slotted Aloha.

In one example, when a size of the backoff window W is small, the performance may be limited by the size of W.

In another example, when the size of the backoff window W is, for example, 512, and if, for example, N=512, then the performance may be around 0.368*N, which is only around 37%. According to this example, a medium may be occupied by collision transmissions most of the time, e.g., due to a high collision rate. In one example, if a discovery window can accommodate T transmissions, then only 37% of the T transmission will be successful.

In some demonstrative embodiments, an expected number of successful transmissions in each discovery window may be computed, for example, assuming that the Discovery window (DW) is 16 milliseconds (ms) long, each service discovery frame is 150 microseconds (us) long, a Distributed Coordination Function (DCF) Interframe Space (DIFS) duration is 28 us, and a window size is 9 us.

In some demonstrative embodiments, the overhead for each transmission may be derived, for example, as described below.

In some demonstrative embodiments, the probability that a backoff window is not chosen by any device may be determined, e.g., as follows:

$$\left( \frac{W-1}{W} \right)^N \quad (3)$$

Accordingly, the probability that a backoff window is chosen by the same device may be determined, e.g., as follows:

$$1 - \left( \frac{W-1}{W} \right)^N \quad (4)$$

In some demonstrative embodiments, the expected number of backoff windows before one transmission may be derived, e.g., as follows:

$$1 \bigg/ \left[ 1 - \left( \frac{W-1}{W} \right)^N \right] \quad (5)$$

In some demonstrative embodiments, a DIFS may be required before a new round of contention. Accordingly, the overhead may be determined, e.g., as follows:

$$28 + 9 \bigg/ \left[ 1 - \left( \frac{W-1}{W} \right)^N \right] \quad (6)$$

such overhead may be about 42 us, e.g., assuming W is 512.

In some demonstrative embodiments, the expected number of possible transmissions, denoted T, in each DW may be determined, e.g., as follows:

$$T = 16000/(42+150) = 83 \quad (7)$$

Accordingly, the expected number of successful transmissions may be 30.8, e.g., 83*0.37.

In some demonstrative embodiments, performance may be improved using a discovery window including a plurality of access windows, e.g., as described below.

In some demonstrative embodiments, it may be assumed that the discovery window includes A access windows, and the backoff window size W may be chosen, for example, when a device contends in an access window. According to these embodiments, a device may choose an access window to contend in a uniformly random manner, and the device may start access at the boundary of each access window.

In some demonstrative embodiments, the size of an access window, denoted S, may be set to accommodate the duration of one transmission plus the overhead of window size, e.g., as follows:

$$S = (W*9+150) \text{us} \quad (8)$$

Accordingly, the number of access windows A may be determined, e.g., as follows:

$$A = 16000/(W*9+150) \quad (9)$$

In some demonstrative embodiments, the average number of devices contending in an access window may be determined, for example, as follows:

$$\frac{N}{A} \quad (10)$$

In some demonstrative embodiments, the probability of one successful transmission, denoted Pt, in an access window may be determined, for example, as follows:

$$Pt = \frac{N}{A*W}\left[\left(\frac{W-1}{W}\right)^{\frac{N}{A}-1} + \left(\frac{W-2}{W}\right)^{\frac{N}{A}-1} + \ldots + \left(\frac{1}{W}\right)^{\frac{N}{A}-1}\right] \quad (11)$$

In some demonstrative embodiments, it may be assumed that W=16 and N=512, e.g., as described above. According to this assumption, A=54.4. Accordingly, the probability Pt may be derived as 0.7316.

Therefore, the expected number of successful transmissions in a DW may be determined to be 39.8, e.g., 0.7316*A=39.8.

In some demonstrative embodiments, the expected number of successful transmissions in a DW is about 30% higher than the number, e.g., 30.8, derived above with respect to a backoff scheme not utilizing the access windows.

Some demonstrative embodiments are described above using assumed parameters corresponding to the 2.4 G/5 GHz bands. However, other embodiments may be implemented in a similar manner with respect to any other bands, for example, the Sub 1 GHz band, e.g., in accordance with IEEE 802.11ah, the 60 GHz band, e.g., in accordance with IEEE 802.11ad, and/or any other, protocol or standard.

Figure 4:
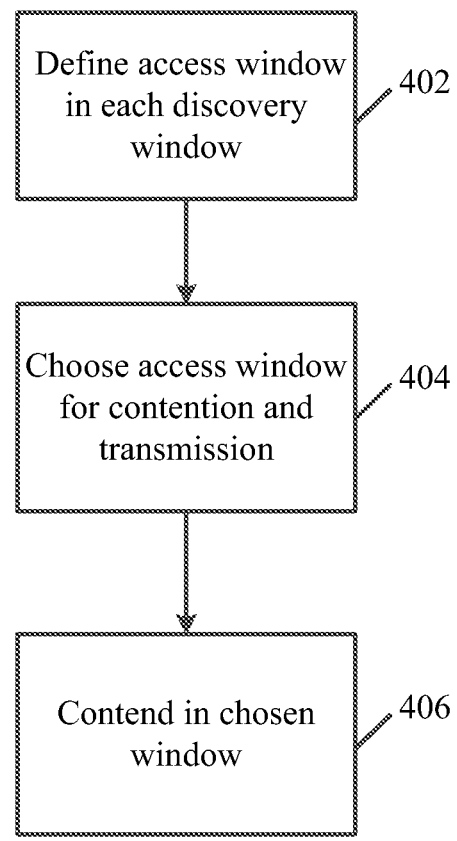
FIG. 4 is a schematic flow-chart illustration of a method of communicating during a discovery window, in accordance with some demonstrative embodiments.

Reference is made to FIG. 4, which schematically illustrates a flow-chart of a method of communicating during a discovery window, in accordance with some demonstrative embodiments. For example, one or more of the operations of the method of FIG. 4 may be performed by a wireless communication system, e.g., system 100 (FIG. 1); a wireless device, e.g., wireless devices 102 and/or 140 (FIG. 1); a radio, e.g., radios 114 and/or 154 (FIG. 1); a controller, e.g., controllers 124 and/or 154 (FIG. 1); and/or a message processor, e.g., message processors 128 and/or 158 (FIG. 1).

As indicated at block 402, the method may include setting, configuring and/or defining one or more access windows in a discovery window, e.g., in each discovery window. For example, controller 124 (FIG. 1) may set, configure and/or define one or more access windows 302 (FIG. 3) in discovery window 300 (FIG. 3), e.g., as described above.

As indicated at block 404, the method may include selecting an access window for contention and transmission. For example, controller 124 (FIG. 1) may select access window 306 (FIG. 3) of access windows 302 (FIG. 3) within discovery window 300 (FIG. 3) for contention and transmission, e.g., as described above.

As indicated at block 406, the method may include contending to transmit in the chosen access window. For example, device 102 (FIG. 1) may contend to transmit in access window 306 (FIG. 3) within discovery window 300 (FIG. 3), e.g., as described above.

Figure 5:
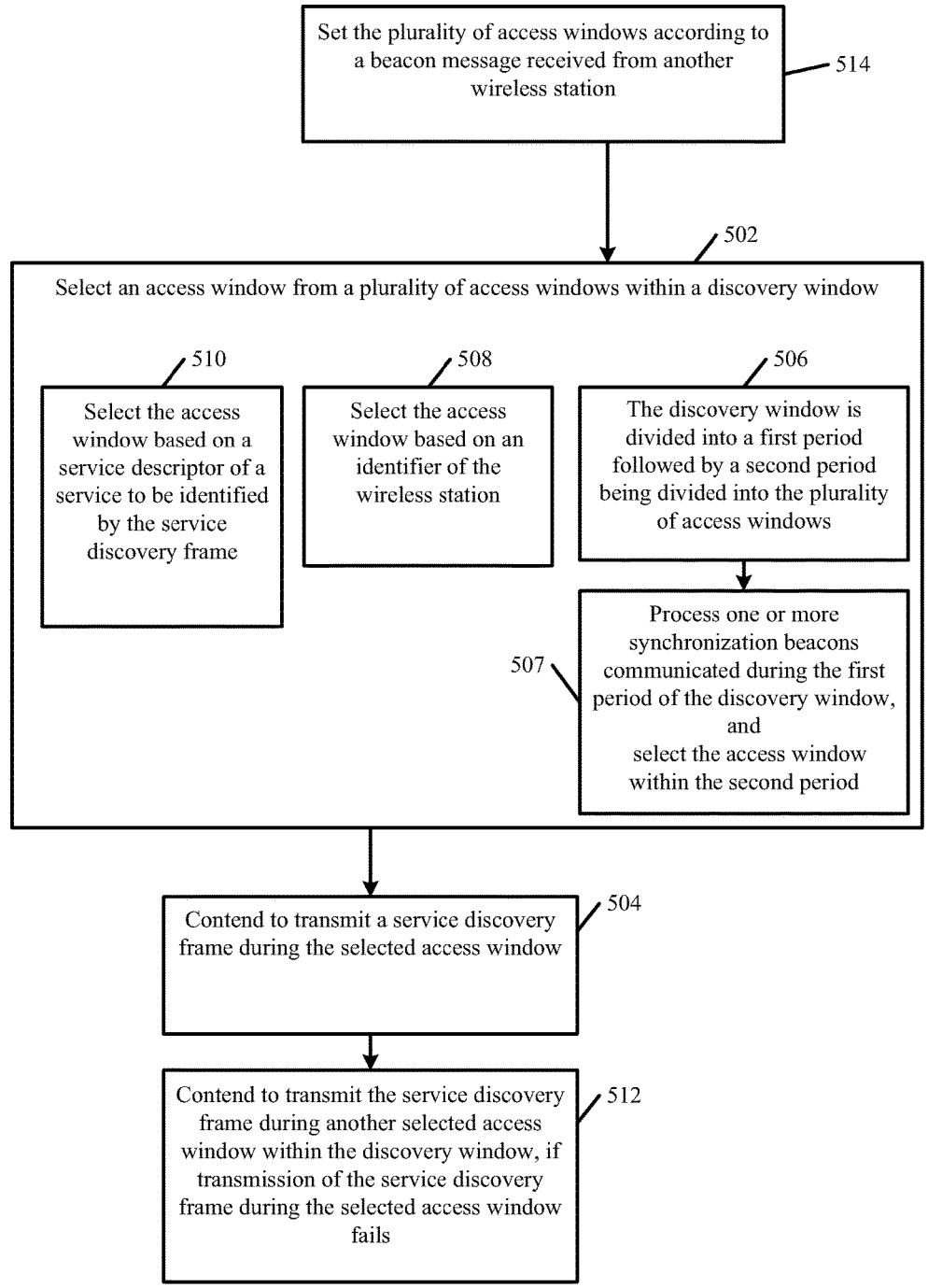
FIG. 5 is a schematic flow-chart illustration of a method of communicating during a discovery window, in accordance with some demonstrative embodiments.

Reference is made to FIG. 5, which schematically illustrates a method of communicating during a discovery window, in accordance with some demonstrative embodiments. For example, one or more of the operations of the method of FIG. 5 may be performed by a wireless communication system, e.g., system 100 (FIG. 1); a wireless device, e.g., wireless devices 102 and/or 140 (FIG. 1); a radio, e.g., radios 114 and/or 154 (FIG. 1); a controller, e.g., controllers 124 and/or 154 (FIG. 1); and/or a message processor, e.g., message processors 128 and/or 158 (FIG. 1).

As indicated at block 502, the method may include selecting an access window from a plurality of access windows within a discovery window, the discovery window being configured to communicate awareness networking messages according to a contention mechanism. For example, controller 124 (FIG. 1) may select access window 306 (FIG. 3) from the plurality of access windows 302 (FIG. 3) within discovery window 300 (FIG. 3), e.g., as described above.

As indicated at block 504, the method may include contending to transmit a service discovery frame during the selected access window. For example, radio 114 (FIG. 1) may contend to transmit the service discovery frame during access window 306 (FIG. 3), e.g., as described above.

As indicated at block 506, selecting the access window may include selecting the access window within a discovery window, which includes, e.g., which is divided into, a first period followed by a second period, the second period including, e.g., being divided into, the plurality of access windows. For example, controller 124 (FIG. 1) may be configured to select access window 306 (FIG. 3) within discovery window 300 (FIG. 3), which is divided into first period 305 (FIG. 3) followed by second period 303 (FIG. 3), e.g., as described above.

As indicated at block 507, the method may include processing one or more synchronization beacons communicated during the first period of the discovery window, and selecting the access window within the second period. For example, controller 124 (FIG. 1) may process one or more synchronization beacons during first period 305 (FIG. 3), and may select access window 306 (FIG. 3) during second period 303 (FIG. 3), e.g., as described above.

As indicated at block 508, selecting the access window may include selecting the access window based on an identifier of the wireless station. For example, controller 124 (FIG. 1) may select access window 306 (FIG. 3) based on an identifier of device 102 (FIG. 1), e.g., as described above.

As indicated at block 510, selecting the access window may include selecting the access window based on a service descriptor of a service to be identified by the service discovery frame. For example, controller 124 (FIG. 1) may select access window 306 (FIG. 3) based on the service descriptor of the service to be identified by the service discovery frame, e.g., as described above.

As indicated at block 512, the method may include contending to transmit the service discovery frame during another selected access window within the discovery window, for example, if transmission of the service discovery frame during the selected access window fails. For example, radio 114 (FIG. 1) may contend to transmit the service discovery frame during an access window 308 (FIG. 3), for example, if transmission of the service discovery frame during access window 306 (FIG. 3) fails, e.g., as described above.

As indicated at block 514, the method may include setting the plurality of access windows according to a beacon message received from another wireless station. For example, controller 124 (FIG. 1) may set the plurality of access windows according to beacon message 109 (FIG. 1) received from device 140 (FIG. 1), e.g., as described above.

Figure 6:
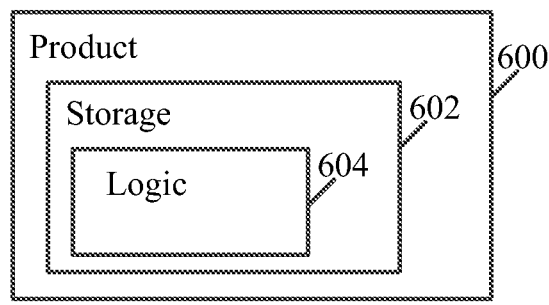
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of devices 102 (FIG. 1) and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more of the operations described above with respect to FIGS. 4 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to select an access window from a plurality of access windows within a discovery window, the discovery window being configured to communicate awareness networking messages according to a contention mechanism; and contend to transmit a service discovery frame during the selected access window.

Example 2 includes the subject matter of Example 1, and optionally, wherein an entire duration of the discovery window includes the plurality of access windows.

Example 3 includes the subject matter of Example 1, and optionally, wherein only part of the discovery window includes the plurality of access windows.

Example 4 includes the subject matter of Example 1, and optionally, wherein the discovery window includes a first period followed by a second period, the second period including the plurality of access windows.

Example 5 includes the subject matter of Example 4, wherein the apparatus is configured to cause the wireless station to process one or more synchronization beacons communicated during the first period of the discovery window, and to select the access window within the second period.

Example 6 includes the subject matter of Example 4 or 5, and optionally, wherein a duration of the first period is 2 milliseconds or less.

Example 7 includes the subject matter of any one of Examples 1-6, and optionally, wherein the apparatus is to cause the wireless station to contend to transmit the service discovery frame during another selected access window within the discovery window, if transmission of the service discovery frame during the selected access window fails.

Example 8 includes the subject matter of any one of Examples 1-7, wherein the apparatus is to cause the wireless station to randomly select the access window.

Example 9 includes the subject matter of any one of Examples 1-7, and optionally, wherein the apparatus is to cause the wireless station to select the access window based on an identifier of the wireless station.

Example 10 includes the subject matter of Example 9, and optionally, wherein the identifier of the wireless station comprises a Media Access Control (MAC) address of the wireless station.

Example 11 includes the subject matter of any one of Examples 1-7, and optionally, wherein the apparatus is to cause the wireless station to select the access window based on a service descriptor of a service to be identified by the service discovery frame.

Example 12 includes the subject matter of any one of Examples 1-11, and optionally, wherein the apparatus is to cause the wireless station to set the plurality of access windows according to a beacon message received from another wireless station.

Example 13 includes the subject matter of Example 12, and optionally, wherein the beacon message comprises a first access window start time, and an access window duration.

Example 14 includes the subject matter of any one of Examples 1-13, and optionally, wherein the service discovery frame comprises a Neighbor Awareness Networking (NAN) Service Discovery Frame (SDF).

Example 15 includes the subject matter of any one of Examples 1-14, and optionally, wherein the apparatus is to cause the wireless station to contend to transmit the service discovery frame over a 2.4 Gigahertz (GHz) or 5 GHz band.

Example 16 includes the subject matter of any one of Examples 1-14, and optionally, wherein the apparatus is to cause the wireless station to contend to transmit the service discovery frame over a sub 1 Gigahertz (S1G) band.

Example 17 includes the subject matter of any one of Examples 1-14, and optionally, wherein the service discovery frame is in compliance with an IEEE 802.11ah Specification.

Example 18 includes the subject matter of any one of Examples 1-14, and optionally, wherein the service discovery frame is in compliance with a Wireless Fidelity (WiFi) Specification.

Example 19 includes the subject matter of any one of Examples 1-18, and optionally, comprising a radio to transmit the service discovery frame.

Example 20 includes the subject matter of any one of Examples 1-19, and optionally, comprising one or more antennas, and a memory.

Example 21 includes a system comprising a wireless device, the wireless device comprising one or more antennas; a memory; a processor; a controller to select an access window from a plurality of access windows within a discovery window, the discovery window being configured to communicate awareness networking messages according to a contention mechanism; and a radio to contend to transmit a service discovery frame during the selected access window.

Example 22 includes the subject matter of Example 21, and optionally, wherein an entire duration of the discovery window includes the plurality of access windows.

Example 23 includes the subject matter of Example 21, and optionally, wherein only part of the discovery window includes the plurality of access windows.

Example 24 includes the subject matter of Example 21, and optionally, wherein the discovery window includes a first period followed by a second period, the second period including the plurality of access windows.

Example 25 includes the subject matter of Example 24, and optionally, wherein the wireless device is to process one or more synchronization beacons communicated during the first period of the discovery window, and to select the access window within the second period.

Example 26 includes the subject matter of Example 24 or 25, and optionally, wherein a duration of the first period is 2 milliseconds or less.

Example 27 includes the subject matter of any one of Examples 21-26, and optionally, wherein the wireless device is to contend to transmit the service discovery frame during another selected access window within the discovery window, if transmission of the service discovery frame during the selected access window fails.

Example 28 includes the subject matter of any one of Examples 21-27, and optionally, wherein the controller is to randomly select the access window.

Example 29 includes the subject matter of any one of Examples 21-27, and optionally, wherein the controller is to select the access window based on an identifier of the wireless station.

Example 30 includes the subject matter of Example 29, and optionally, wherein the identifier of the wireless station comprises a Media Access Control (MAC) address of the wireless station.

Example 31 includes the subject matter of any one of Examples 21-27, and optionally, wherein the controller is to select the access window based on a service descriptor of a service to be identified by the service discovery frame.

Example 32 includes the subject matter of any one of Examples 21-31, and optionally, wherein the controller is to set the plurality of access windows according to a beacon message received from another wireless station.

Example 33 includes the subject matter of Example 32, and optionally, wherein the beacon message comprises a first access window start time, and an access window duration.

Example 34 includes the subject matter of any one of Examples 21-33, and optionally, wherein the service discovery frame comprises a Neighbor Awareness Networking (NAN) Service Discovery Frame (SDF).

Example 35 includes the subject matter of any one of Examples 21-34, and optionally, wherein the radio is to contend to transmit the service discovery frame over a 2.4 Gigahertz (GHz) or 5 GHz band.

Example 36 includes the subject matter of any one of Examples 21-34, and optionally, wherein the radio is to contend to transmit the service discovery frame over a sub 1 Gigahertz (S1G) band.

Example 37 includes the subject matter of any one of Examples 21-34, and optionally, wherein the service discovery frame is in compliance with an IEEE 802.11ah Specification.

Example 38 includes the subject matter of any one of Examples 21-34, and optionally, wherein the service discovery frame is in compliance with a Wireless Fidelity (WiFi) Specification.

Example 39 includes a method to be performed at a wireless device, the method comprising selecting an access window from a plurality of access windows within a discovery window, the discovery window being configured to communicate awareness networking messages according to a contention mechanism; and contending to transmit a service discovery frame during the selected access window.

Example 40 includes the subject matter of Example 39, and optionally, wherein an entire duration of the discovery window includes the plurality of access windows.

Example 41 includes the subject matter of Example 39, and optionally, wherein only part of the discovery window includes the plurality of access windows.

Example 42 includes the subject matter of Example 39, and optionally, wherein the discovery window includes a first period followed by a second period, the second period including the plurality of access windows.

Example 43 includes the subject matter of Example 42, and optionally, comprising processing one or more synchronization beacons communicated during the first period of the discovery window, and selecting the access window within the second period.

Example 44 includes the subject matter of Example 42 or 43, and optionally, wherein a duration of the first period is 2 milliseconds or less.

Example 45 includes the subject matter of any one of Examples 39-44, and optionally, comprising contending to transmit the service discovery frame during another selected access window within the discovery window, if transmission of the service discovery frame during the selected access window fails.

Example 46 includes the subject matter of any one of Examples 39-45, and optionally, comprising randomly selecting the access window.

Example 47 includes the subject matter of any one of Examples 39-45, and optionally, comprising selecting the access window based on an identifier of the wireless station.

Example 48 includes the subject matter of Example 47, and optionally, wherein the identifier of the wireless station comprises a Media Access Control (MAC) address of the wireless station.

Example 49 includes the subject matter of any one of Examples 39-45, and optionally, comprising selecting the access window based on a service descriptor of a service to be identified by the service discovery frame.

Example 50 includes the subject matter of any one of Examples 39-49, and optionally, comprising setting the plurality of access windows according to a beacon message received from another wireless station.

Example 51 includes the subject matter of Example 50, and optionally, wherein the beacon message comprises a first access window start time, and an access window duration.

Example 52 includes the subject matter of any one of Examples 39-51, and optionally, wherein the service discovery frame comprises a Neighbor Awareness Networking (NAN) Service Discovery Frame (SDF).

Example 53 includes the subject matter of any one of Examples 39-52, and optionally, comprising contending to transmit the service discovery frame over a 2.4 Gigahertz (GHz) or 5 GHz band.

Example 54 includes the subject matter of any one of Examples 39-52, and optionally, comprising contending to transmit the service discovery frame over a sub 1 Gigahertz (S1G) band.

Example 55 includes the subject matter of any one of Examples 39-52, and optionally, wherein the service discovery frame is in compliance with an IEEE 802.11ah Specification.

Example 56 includes the subject matter of any one of Examples 39-52, and optionally, wherein the service discovery frame is in compliance with a Wireless Fidelity (WiFi) Specification.

Example 57 includes a product including one or more tangible computer-readable non-transitory storage media comprising computer-executable instructions operable to, when executed by at least one computer processor, enable the at least one computer processor to implement a method at a wireless device, the method comprising selecting an access window from a plurality of access windows within a discovery window, the discovery window being configured to communicate awareness networking messages according to a contention mechanism; and contending to transmit a service discovery frame during the selected access window.

Example 58 includes the subject matter of Example 57, and optionally, wherein an entire duration of the discovery window includes the plurality of access windows.

Example 59 includes the subject matter of Example 57, and optionally, wherein only part of the discovery window includes the plurality of access windows.

Example 60 includes the subject matter of Example 57, and optionally, wherein the discovery window includes a first period followed by a second period, the second period including the plurality of access windows.

Example 61 includes the subject matter of Example 60, and optionally, wherein the method comprises processing one or more synchronization beacons communicated during the first period of the discovery window, and selecting the access window within the second period.

Example 62 includes the subject matter of Example 60 or 61, and optionally, wherein a duration of the first period is 2 milliseconds or less.

Example 63 includes the subject matter of any one of Examples 57-62, and optionally, wherein the method comprises contending to transmit the service discovery frame during another selected access window within the discovery window, if transmission of the service discovery frame during the selected access window fails.

Example 64 includes the subject matter of any one of Examples 57-64, and optionally, wherein the method comprises randomly selecting the access window.

Example 65 includes the subject matter of any one of Examples 57-64, and optionally, wherein the method comprises selecting the access window based on an identifier of the wireless station.

Example 66 includes the subject matter of Example 65, and optionally, wherein the identifier of the wireless station comprises a Media Access Control (MAC) address of the wireless station.

Example 67 includes the subject matter of any one of Examples 57-64, and optionally, wherein the method comprises selecting the access window based on a service descriptor of a service to be identified by the service discovery frame.

Example 68 includes the subject matter of any one of Examples 57-67, and optionally, wherein the method comprises setting the plurality of access windows according to a beacon message received from another wireless station.

Example 69 includes the subject matter of Example 68, and optionally, wherein the beacon message comprises a first access window start time, and an access window duration.

Example 70 includes the subject matter of any one of Examples 57-69, and optionally, wherein the service discovery frame comprises a Neighbor Awareness Networking (NAN) Service Discovery Frame (SDF).

Example 71 includes the subject matter of any one of Examples 57-70, and optionally, wherein the method comprises contending to transmit the service discovery frame over a 2.4 Gigahertz (GHz) or 5 GHz band.

Example 72 includes the subject matter of any one of Examples 57-70, and optionally, wherein the method comprises contending to transmit the service discovery frame over a sub 1 Gigahertz (S1G) band.

Example 73 includes the subject matter of any one of Examples 57-70, and optionally, wherein the service discovery frame is in compliance with an IEEE 802.11ah Specification.

Example 74 includes the subject matter of any one of Examples 57-70, and optionally, wherein the service discovery frame is in compliance with a Wireless Fidelity (WiFi) Specification.

Example 75 includes an apparatus of wireless communication, the apparatus comprising means for selecting at wireless station an access window from a plurality of access windows within a discovery window, the discovery window being configured to communicate awareness networking messages according to a contention mechanism; and means for contending to transmit a service discovery frame during the selected access window.

Example 76 includes the subject matter of Example 75, and optionally, wherein an entire duration of the discovery window includes the plurality of access windows.

Example 77 includes the subject matter of Example 75, and optionally, wherein only part of the discovery window includes the plurality of access windows.

Example 78 includes the subject matter of Example 75, and optionally, wherein the discovery window includes a first period followed by a second period, the second period including the plurality of access windows.

Example 79 includes the subject matter of Example 78, and optionally, comprising means for processing one or more synchronization beacons communicated during the first period of the discovery window, and selecting the access window within the second period.

Example 80 includes the subject matter of Example 78 or 79, and optionally, wherein a duration of the first period is 2 milliseconds or less.

Example 81 includes the subject matter of any one of Examples 75-80, and optionally, comprising means for contending to transmit the service discovery frame during another selected access window within the discovery window, if transmission of the service discovery frame during the selected access window fails.

Example 82 includes the subject matter of any one of Examples 75-81, and optionally, comprising means for randomly selecting the access window.

Example 83 includes the subject matter of any one of Examples 75-81, and optionally, comprising means for selecting the access window based on an identifier of the wireless station.

Example 84 includes the subject matter of Example 83, and optionally, wherein the identifier of the wireless station comprises a Media Access Control (MAC) address of the wireless station.

Example 85 includes the subject matter of any one of Examples 75-81, and optionally, comprising means for selecting the access window based on a service descriptor of a service to be identified by the service discovery frame.

Example 86 includes the subject matter of any one of Examples 75-85, and optionally, comprising means for setting the plurality of access windows according to a beacon message received from another wireless station.

Example 87 includes the subject matter of Example 86, and optionally, wherein the beacon message comprises a first access window start time, and an access window duration.

Example 88 includes the subject matter of any one of Examples 75-87, and optionally, wherein the service discovery frame comprises a Neighbor Awareness Networking (NAN) Service Discovery Frame (SDF).

Example 89 includes the subject matter of any one of Examples 75-88, and optionally, comprising means for contending to transmit the service discovery frame over a 2.4 Gigahertz (GHz) or 5 GHz band.

Example 90 includes the subject matter of any one of Examples 75-88, and optionally, comprising means for contending to transmit the service discovery frame over a sub 1 Gigahertz (S1G) band.

Example 91 includes the subject matter of any one of Examples 75-88, and optionally, wherein the service discovery frame is in compliance with an IEEE 802.11ah Specification.

Example 92 includes the subject matter of any one of Examples 75-88, and optionally, wherein the service discovery frame is in compliance with a Wireless Fidelity (WiFi) Specification.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless Neighbor Awareness Networking (NAN) station to:

select a particular access window from a plurality of access windows within a discovery window (DW) of a plurality of DWs according to a discovery scheme corresponding to a NAN cluster comprising the wireless NAN station, the discovery scheme comprising a DW interval between two consecutive DWs, the DW interval to include communication of a plurality of discovery beacons, the discovery window configured to communicate NAN messages in the NAN cluster according to a contention mechanism, the NAN messages comprising one or more synchronization beacons and one or more NAN service discovery frames (SDFs), the plurality of access windows comprises at least first and second access windows, which are for transmission of the NAN SDFs according to the contention mechanism, the particular access window selected from the at least first and second access windows; and contend to transmit a NAN SDF during the particular access window.

2. The apparatus of claim 1, wherein an entire duration of said discovery window includes said plurality of access windows.

3. The apparatus of claim 1, wherein the discovery window includes a first period followed by a second period, the second period including said plurality of access windows.

4. The apparatus of claim 3 configured to cause the wireless NAN station to process the one or more synchronization beacons communicated during the first period of the discovery window, and to select the particular access window within the second period.

5. The apparatus of claim 3, wherein a duration of said first period is 2 milliseconds or less.

6. The apparatus of claim 1 configured to cause the wireless NAN station to contend to transmit the NAN SDF during another access window within said discovery window, if transmission of said NAN SDF during the particular access window fails.

7. The apparatus of claim 1 configured to cause the wireless NAN station to randomly select the particular access window.

8. The apparatus of claim 1 configured to cause the wireless NAN station to select the particular access window based on an identifier of said wireless NAN station.

9. The apparatus of claim 8, wherein the identifier of said wireless NAN station comprises a Media Access Control (MAC) address of said wireless NAN station.

10. The apparatus of claim 1 configured to cause the wireless NAN station to select the particular access window based on a service descriptor of a service to be identified by the NAN SDF.

11. The apparatus of claim 1 configured to cause the wireless NAN station to set said plurality of access windows according to a synchronization beacon message received from another wireless NAN station.

12. The apparatus of claim 11, wherein said synchronization beacon message comprises a first access window start time, and an access window duration.

13. The apparatus of claim 1 configured to cause the wireless NAN station to contend to transmit the NAN SDF over a 2.4 Gigahertz (GHz) or 5GHz band.

14. The apparatus of claim 1 configured to cause the wireless NAN station to contend to transmit the NAN SDF over a sub 1 Gigahertz (S1G) band.

15. A system comprising a wireless Neighbor Awareness Networking (NAN) device, the wireless NAN device comprising:

one or more antennas;

a memory;

a processor;
a controller to select a particular access window from a plurality of access windows within a discovery window (DW) of a plurality of DWs according to a discovery scheme corresponding to a NAN cluster comprising the wireless NAN device, the discovery scheme comprising a DW interval between two consecutive DWs, the DW interval to include communication of a plurality of discovery beacons, the discovery window configured to communicate NAN messages in the NAN cluster according to a contention mechanism, the NAN messages comprising one or more synchronization beacons and one or more NAN service discovery frames (SDFs), the plurality of access windows comprises at least first and second access windows, which are for transmission of the NAN SDFs according to the contention mechanism, the particular access window selected from the at least first and second access windows; and
a radio to contend to transmit a NAN SDF during the particular access window.

16. The system of claim 15, wherein the discovery window includes a first period followed by a second period, the second period including said plurality of access windows.

17. A method to be performed at a wireless Neighbor Awareness Networking (NAN) device, the method comprising:
selecting a particular access window from a plurality of access windows within a discovery window (DW) of a plurality of DWs according to a discovery scheme corresponding to a NAN cluster comprising the wireless NAN device, the discovery scheme comprising a DW interval between two consecutive DWs, the DW interval to include communication of a plurality of discovery beacons, the discovery window being configured to communicate NAN messages in the NAN cluster according to a contention mechanism, the NAN messages comprising one or more synchronization beacons and one or more NAN service discovery frames (SDFs), the plurality of access windows comprises at least first and second access windows, which are for transmission of the NAN SDFs according to the contention mechanism, the particular access window selected from the at least first and second access windows; and
contending to transmit a NAN SDF during the particular access window.

18. The method of claim 17 comprising contending to transmit the NAN SDF during another access window within said discovery window, if transmission of said NAN SDF during the particular access window fails.

19. The method of claim 17 comprising setting said plurality of access windows according to a synchronization beacon message received from another wireless NAN device.

20. A product including one or more tangible computer-readable non-transitory storage media comprising computer-executable instructions operable to, when executed by at least one processor, enable the at least one processor to cause a wireless Neighbor Awareness Networking (NAN) device to:
select a particular access window from a plurality of access windows within a discovery window (DW) of a plurality of DWs according to a discovery scheme corresponding to a NAN cluster comprising the wireless NAN device, the discovery scheme comprising a DW interval between two consecutive DWs, the DW interval to include communication of a plurality of discovery beacons, the discovery window configured to communicate NAN messages in the NAN cluster according to a contention mechanism, the NAN messages comprising one or more synchronization beacons and one or more NAN service discovery frames (SDFs), the plurality of access windows comprises at least first and second access windows, which are for transmission of the NAN SDFs according to the contention mechanism, the particular access window selected from the at least first and second access windows; and
contend to transmit a NAN SDF during the particular access window.

21. The product of claim 20, wherein the discovery window includes a first period followed by a second period, the second period including said plurality of access windows.

22. The product of claim 20, wherein said instructions, when executed, cause the wireless NAN device to contend to transmit the NAN SDF during another access window within said discovery window, if transmission of said the NAN SDF during the particular access window fails.

23. The product of claim 20, wherein said instructions, when executed, cause the wireless NAN device to select the particular access window based on an identifier of said wireless NAN device.

24. The product of claim 20, wherein said instructions, when executed, cause the wireless NAN device to set said plurality of access windows according to a synchronization beacon message received from another wireless NAN device.

* * * * *